United States Patent [19]
God

[11] 3,847,184
[45] Nov. 12, 1974

[54] METAL PIPE WITH SPACED FLEXIBLE PORTIONS

[76] Inventor: Andrew God, P.O. Box 661, Arlington, Va. 22216

[22] Filed: Oct. 5, 1972

[21] Appl. No.: 295,215

[52] U.S. Cl............ 138/120, 138/121, 138/DIG. 8, 285/223
[51] Int. Cl............................................. F16l 11/16
[58] Field of Search .......... 138/121, 122, 120, 118, 138/109, DIG. 8, 173, 134, 137; 285/4, 223; 29/454

[56] References Cited
UNITED STATES PATENTS

| | | | |
|---|---|---|---|
| 290,659 | 12/1883 | Austin............................ | 138/173 X |
| 955,847 | 4/1910 | Carmean........................ | 138/173 X |
| 1,783,605 | 12/1930 | Della............................... | 285/4 |
| 1,842,095 | 1/1932 | Hoffman........................ | 138/173 |
| 3,349,805 | 10/1967 | Fried.............................. | 138/109 |

FOREIGN PATENTS OR APPLICATIONS

| | | | |
|---|---|---|---|
| 893,194 | 6/1944 | France............................ | 138/121 |

OTHER PUBLICATIONS
Publ. "Rex–Flex. Stainless Steel Flexible Tubing" Chicago Metal Hose Corp. 12/1940.

Primary Examiner—Richard C. Queisser
Assistant Examiner—Daniel M. Yasich
Attorney, Agent, or Firm—Edmund M. Jaskiewicz

[57] ABSTRACT

An integral unitary pipe of metal as used in plumbing for the conveyance of liquids or gases particularly along a non-linear path has alternating cylindrical and flexible portions along its length. Each flexible portion comprises a plurality of straight or helical corrugations to enable the pipe to be shaped into a non-linear configuration along the flexible portions.

2 Claims, 5 Drawing Figures

METAL PIPE WITH SPACED FLEXIBLE PORTIONS

The present invention relates to metal pipes for the conveyance of fluids, more particularly, to such a pipe which can be readily shaped into a non-linear configuration.

A system for the conveyance of liquids or gases such as a plumbing system is formed of a number of straight pipe sections which are connected at their ends by 90° elbows or 45° elbows to obtain the necessary configuration. Such pipes are generally fabricated in relatively long lengths and these lengths must be cut to the proper size so as to fit between a pair of connecting members. Considerable time is required on the part of skilled craftsmen in order to cut the pipes to the proper shapes and to make the necessary connections between these cut lengths.

Thin walled tubing has been used in order to obtain a non-linear configuration. The walls of such tubing are sufficiently thin to enable the tube to be readily bent to a desired shape. However, the very thin dimension of the wall severely limits the use of such thin wall tubes in plumbing systems. It has also been proposed to manufacture flexible lengths of pipe with these flexible lengths having connections at both ends so that a length cannot be cut. Thus, these lengths must be manufactured in a wide variety of lengths to adapt to various plumbing conditions.

It is therefore the principal object of the present invention to provide a pipe for the conveyance of a fluid which pipe can be readily shaped into a non-linear configuration.

It is another object of the present invention to provide a metal pipe for the conveyance of a fluid which eliminates various angled connections in order to achieve a non-linear configuration.

It is a further object of the present invention to provide an integral unitary metal pipe for the conveyance of a fluid wherein the pipe is provided with spaced cylindrical and flexible portions.

The objects of the present invention are achieved and the disadvantages of the prior art are eliminated by the pipe disclosed as the present invention. According to one aspect of this invention there is provided an integral unitary pipe for the conveyance of fluid, particularly along a nonlinear path. The pipe is of metal and comprises longitudinally alternating cylindrical and flexible portions. Each flexible portion comprises a plurality of corrugations throughout its length to enable the pipe to be shaped at its flexible portions into a non-linear configuration. The corrugations may be straight or helical and a flexible portion may incorporate both straight and helical corrugations.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views as specific embodiment and modifications of the present invention will be described in detail.

Figure 1:
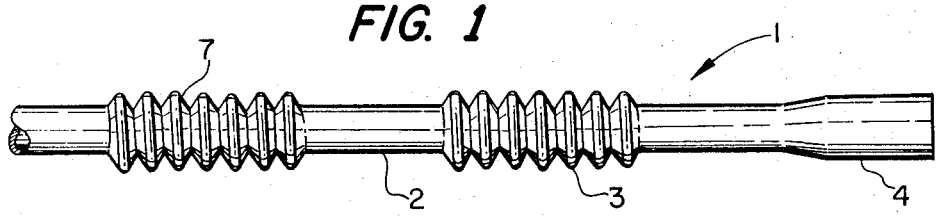
FIG. 1 is a side elevational view of a portion of a length of pipe incorporating the present invention.
Figure 3:
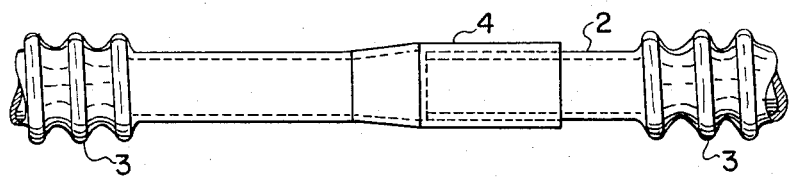
FIG. 3 is a side elevational view of a coupling joint between two lengths of pipe according to the present invention.

In FIG. 1 there is indicated generally at 1 a pipe according to the present invention which is provided with longitudinally alternating cylindrical portions 2 and flexible portions 3. The pipe 1 is of metal such as cooper, aluminum or alloys thereof. The pipe 1 could be manufactured in relatively long lengths such as 20 feet and in the standard ½, ¾ inch and 1 inch sizes. One end of the pipe is provided with a formed coupling 4 to enable two lengths of pipe to be connected without the necessity of a standard coupling. This eliminates a coupling fitting and the sweating of two joints. The present connection as seen in FIG. 3 includes a soldered joint and would require no fitting and the sweating of only one joint.

The flexible portions 3 are of substantially equal length as the cylindrical portions 2 and the cylindrical portions may be 3 inches long with the flexible portions being 4 inches long along a standard length of pipe.

Figure 4:
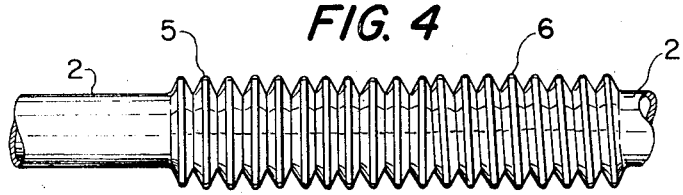
FIG. 4 is an elevational view of a flexible portion of the pipe having both straight and helical corrugations.

Each flexible portion comprises a plurality of corrugations along its length with the corrugations being either straight as seen at 5 in FIG. 4 wherein the corrugations are at right angles to the longitudinal central axis of the pipe or the corrugations may be helical as shown at 6 in FIG. 4. The corrugations may also comprise the so-called straight corrugations which are inclined at an angle to the axis of the pipe as shown at 7 in FIG. 1.

The straight and helical corrugations are provided with a 30° pitch which would allow the formation of a 90° el fitting with the same radius as forged fittings in common use. Thus one obtains a right angle bend of the pipe with a relatively small radius and a large sweep el would thus not be necessary. The bending of the pipe length along its flexible portions to obtain a non-linear configuration can be seen in FIG. 2.

Figure 5:
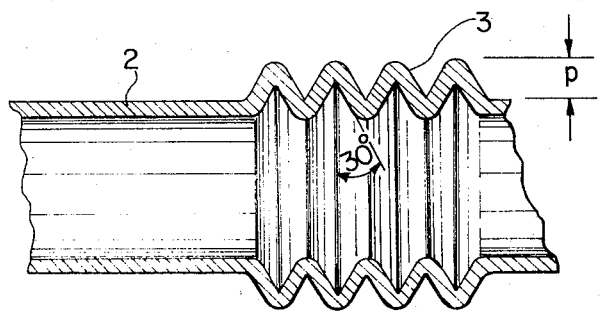
FIG. 5 is a longitudinal sectional view of a portion of the pipe in FIG. 1 in enlarged scale showing the joining portions of cylindrical and straight sections.

The corrugations project beyond the outer diameter of the wall of a cylindrical portion as can be seen in FIG. 5 so as not to decrease the flow capacity of the pipe. Thus, the inner diameter of the pipe is the same in both the cylindrical and flexible portions. The projection of the corrugations beyond the outer diameter of the cylindrical portion of a pipe is indicated at $p$ in FIG. 5. By way of example, for a half inch I.D. pipe $p$ would equal ⅛ of an inch, for a ¾ inch pipe $p$ would be 3/16 of an inch and for a 1 inch pipe $p$ would equal ¼ of an inch.

Figure 2:
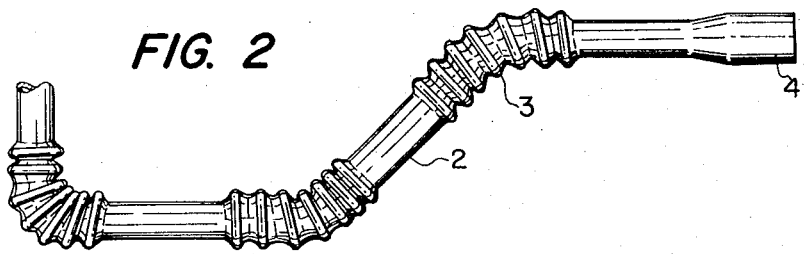
FIG. 2 is a side elevational view of a pipe portion as shown in FIG. 1 bent into a non-linear configuration.

Since a pipe according to the present invention can be provided in a relatively long length, i.e. about 20 feet, a single length of pipe may be bent along its flexible portions to obtain any desired configuration as shown by way of example in FIG. 2. Thus, a significant number of connections are eliminated in a plumbing installation using this pipe. The straight or cylindrical portions 2 enable the soldering or brazing of Y's, Tee's, valves and other tap connections as required and provide space for cutting of the pipe to various lengths, if this should be desired.

The walls of the pipe according the present invention have a substantial thickness as is evident from the drawings. Thus, the invention is incorporated of pipes for plumbing and other applications for the conveyance of fluids where the pipes have a substantial rigidity and strength, as opposed to thin-walled tubing. Further, the pipe according to the present invention is made of metal as opposed to the flexible hoses of rubber and rubber-like materials known in the prior art.

A pipe according to the present invention may also be made of other metals including stainless steel and alloys thereof or of a plastic or any other ductile material. Pipes have been fabricated, particularly for the conveyance of waste material, from a wide variety of plastics. The structural properties of such pipes are quite similar to those of metal pipes in that the plastic pipes are substantially rigid and possess considerable strength as opposed to thin-walled plastic tubing. A plastic, when heat is applied to the flexible or corrugated portion of the pipe, would soften sufficiently to permit bending and shaping to the configuration or angle desired. When the plastic cools, it would revert to its original hardness in its new shape. The present invention can be applied in any situation that requires the conveyance of liquids or other fluid material capable of being conveyed through pipes by either liquid or air pressure.

Thus it can be seen that the present invention has provided a pipe for the conveyance of fluids wherein the pipe has alternating cylindrical and flexible portions to enable the pipe to be readily bent into any desired configuration with a minimum of connections.

It will be understood that this invention is susceptible to modification in order to adapt it to different usages and conditions, and accordingly, it is desired to comprehend such modifications within this invention as may fall within the scope of the appended claims.

What is claimed is:

1. An integral unitary pipe for the conveyance of a fluid, particularly along a non-linear path, said pipe being of metal and comprising longitudinally alternating cylindrical and flexible portions, each said flexible portion comprising a plurality of corrugations throughout its length whereby the pipe can be shaped at its flexible portions into a non-linear configuration, said cylindrical portions and flexible portions being of substantially the same length, said corrugations each having a 30° pitch with respect to the vertical axis through the apex of the corrugations and extending outwardly of the outer surfaces of the cylindrical portions therebetween such that the flexible portions can be bent at 90° angles with a small radius, one end of said pipe being formed with an enlarged diameter coupling portion, and at least one flexible portion near the end of the pipe and comprising both helical and straight configurations.

2. A pipe as claimed in claim 1 wherein said flexible portions having both helical and straight corrugations are towards each end of the pipe.

* * * * *